(12) United States Patent
McNutt et al.

(10) Patent No.: US 7,796,790 B2
(45) Date of Patent: Sep. 14, 2010

(54) MANUAL TOOLS FOR MODEL BASED IMAGE SEGMENTATION

(75) Inventors: Todd R. McNutt, Verona, WI (US);
Michael Kaus, Hamburg (DE);
Vladimir Pekar, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1073 days.

(21) Appl. No.: 10/595,357

(22) PCT Filed: Oct. 6, 2004

(86) PCT No.: PCT/IB2004/052000

§ 371 (c)(1),
(2), (4) Date: Apr. 12, 2006

(87) PCT Pub. No.: WO2005/038711

PCT Pub. Date: Apr. 28, 2005

(65) Prior Publication Data

US 2007/0133848 A1    Jun. 14, 2007

Related U.S. Application Data

(60) Provisional application No. 60/512,453, filed on Oct. 17, 2003, provisional application No. 60/530,488, filed on Dec. 18, 2003.

(51) Int. Cl.
*G06K 9/00* (2006.01)
*G06K 9/34* (2006.01)
*G06K 9/46* (2006.01)

(52) U.S. Cl. ............... 382/128; 382/131; 382/132; 382/173; 382/181; 382/190; 382/199; 382/294; 345/619; 345/650; 345/661

(58) Field of Classification Search .......... 382/128, 382/131, 132, 173, 181, 190, 199, 209, 215, 382/294; 345/423, 619, 647, 650, 661
See application file for complete search history.

(56) References Cited

U.S. PATENT DOCUMENTS

| | | | | |
|---|---|---|---|---|
| 4,885,702 | A | * | 12/1989 | Ohba .................. 345/419 |
| 5,889,524 | A | * | 3/1999 | Sheehan et al. .......... 345/419 |
| 5,926,568 | A | * | 7/1999 | Chaney et al. ........... 382/217 |
| 6,106,466 | A | * | 8/2000 | Sheehan et al. .......... 600/443 |

(Continued)

FOREIGN PATENT DOCUMENTS

WO    WO02/09611 A2 *    2/2002

OTHER PUBLICATIONS

Barr, Alan H.. "Global and local deformations of solid primitives." ACM SIGGRAPH Computer Graphics 18:3(1984): 21-30. Print.*

(Continued)

*Primary Examiner*—Matthew C Bella
*Assistant Examiner*—Michael A Newman

(57) ABSTRACT

A scanner (18) acquires images of a subject. A 3D model (52) of an organ is selected from an organ model database (50) and dropped over an image of an actual organ. A best fitting means (62) globally scales, translates and/or rotates the model (52) to best fit the actual organ represented by the image. A user uses a mouse (38) to use a set of manual tools (68) to segment and manipulate the model (52)1:o match the image data. The set of tools (68) includes: a Gaussian tool (72) for deforming a surface portion of the model along a Gaussian curve, a spherical push tool (80) for deforming the surface portion along a spherical surface segment, and a pencil tool (90) for manually drawing a line to which the surface portion is redefined.

15 Claims, 6 Drawing Sheets

U.S. PATENT DOCUMENTS

| | | | |
|---|---|---|---|
| 6,201,543 | B1 | 3/2001 | O'Donnell et al. |
| 6,385,332 | B1 * | 5/2002 | Zahalka et al. ............... 382/128 |
| 6,701,174 | B1 * | 3/2004 | Krause et al. ................ 600/407 |
| 6,911,980 | B1 * | 6/2005 | Newell et al. ................ 345/441 |
| 7,167,738 | B2 * | 1/2007 | Schweikard et al. ......... 600/407 |
| 7,200,251 | B2 * | 4/2007 | Joshi et al. ................... 382/128 |
| 2002/0184470 | A1 | 12/2002 | Weese et al. |
| 2003/0018235 | A1 * | 1/2003 | Chen et al. ................... 600/109 |
| 2003/0020714 | A1 * | 1/2003 | Kaus et al. ................... 345/423 |
| 2003/0056799 | A1 | 3/2003 | Young et al. |
| 2003/0194057 | A1 | 10/2003 | Dewaele |
| 2004/0012641 | A1 * | 1/2004 | Gauthier ...................... 345/848 |
| 2004/0246269 | A1 * | 12/2004 | Serra et al. ................... 345/619 |

OTHER PUBLICATIONS

Sederberg, Thomas W., and Scott R. Parry. "Free-form deformation of solid geometric models." ACM SIGGRAPH Computer Graphics 20:4(1986): 151-160. Print.*

Coquillart, Sabine. "Extended free-form deformation: a sculpturing tool for 3D geometric modeling." Proceedings of the 17th annual conference on Computer graphics and interactive techniques 24:4(1990): 187-196. Print.*

McInerney, Tim, and Demetri Terzopoulos. "Deformable Models in Medical Image Analysis." Medical Image Analysis. 1.2 (1996): 91-108. Print.*

Kang, Yan, Klaus Engelke, and Willi Kalender. "Interactive 3D editing tools for image segmentation." Medical Image Analysis 8. 8. (2003 (Online)): 35-46. Print.*

Young, et al. "Left Ventricular Mass and Volume: Fast Calculation with Guide-Point Modeling on MR Images." Radiology 2000. 216. (2000): 597-602. Print.*

Weese, J., et al., Shape Constrained Deformable Models for 3D Medical Image Segmentation; 2001; Lecture Notes on Computer Science; vol. 2082; pp. 380-387.

* cited by examiner

MANUAL TOOLS FOR MODEL BASED IMAGE SEGMENTATION

CROSS REFERENCE TO RELATED APPLICATIONS

This application claims the benefit of U.S. provisional application Ser. No. 60/512,453 filed Oct. 17, 2003, and provisional application Ser. No. 60/530,488 filed Dec. 18, 2003, which are both incorporated herein by reference.

DESCRIPTION

The present invention relates to the diagnostic imaging systems and methods. It finds particular application in conjunction with the model based image segmentation of diagnostic medical images and will be described with particular reference thereto. Although described by the way of example with reference to x-ray computer tomography, it will further be appreciated that the invention is equally applicable to other diagnostic imaging techniques which generate 3D image representations.

Radiation therapy has been recently experiencing a transition from conformal methods to Intensity Modulation Radiation Therapy (IMRT). IMRT enables an improved dose distribution in the patient's body and makes possible precise delivery of high radiation dose directly to the tumor while maximally sparing the surrounding healthy tissue. Accurate target and "organ at risk" delineation is important in IMRT. Presently, the procedure is performed manually in 2D slices, which is cumbersome and the most time-consuming part of the radiation therapy planning process. The use of robust and reliable automatic segmentation technique would substantially facilitate the planning process and increase patient throughput.

Model based image segmentation is a process of segmenting (contouring) medical diagnostic images that is used to improve robustness of segmentation methods. Typically, a pre-determined 3D model of the region of interest or organ to be segmented in the diagnostic image is selected. The model represents an anatomical organ such as a bladder or femur, but it may also represent a structure such as a target volume for radiotherapy. In many cases, the model can be used to aid automated image segmentation by providing knowledge of the organ shape as an initial starting point for the automated segmentation process. However, in some instances, the auto-segmentation of the image may not be possible, or it is not robust enough to fit a specific organ or a section of the model accurately. Particularly, application of the auto-segmentation to the image data is difficult due to insufficient soft tissue contrast in CT data, high organ variability, and image artifacts, e.g. caused by dental fillings or metal implants. It would be desirable to be able to initiate the segmentation with a model and further complete an accurate segmentation when auto-segmentation is not practical or to enhance the auto-segmentation result for specific situations after auto-segmentation has been completed.

There is a need for the method and apparatus to provide the image segmentation of the model based image that is easily adapted to match a specific patient's anatomy. The present invention provides a new and improved imaging apparatus and method which overcomes the above-referenced problems and others.

In accordance with one aspect of the present invention, a diagnostic imaging system is disclosed. A means selects a shape model of an organ. A means best fits the selected model to an image data. A manual means modifies selected regions of the model to precisely match the image data.

In accordance with another aspect of the present invention, a method of segmenting an image of a diagnostic imaging system is disclosed. A shape model of an organ is selected. The selected model is dragged and dropped on an image data. The selected model is globally scaled, rotated and translated to best fit the image data. Local regions of the model are modified with a set of manual tools to precisely match the image data.

One advantage of the present invention resides in enabling the manipulation of the models to match subject's anatomy.

Another advantage resides in providing a set of diagnostic image modification tools enable the user to modify the models with a mouse.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not to be construed as limiting the invention.

Figure 1:
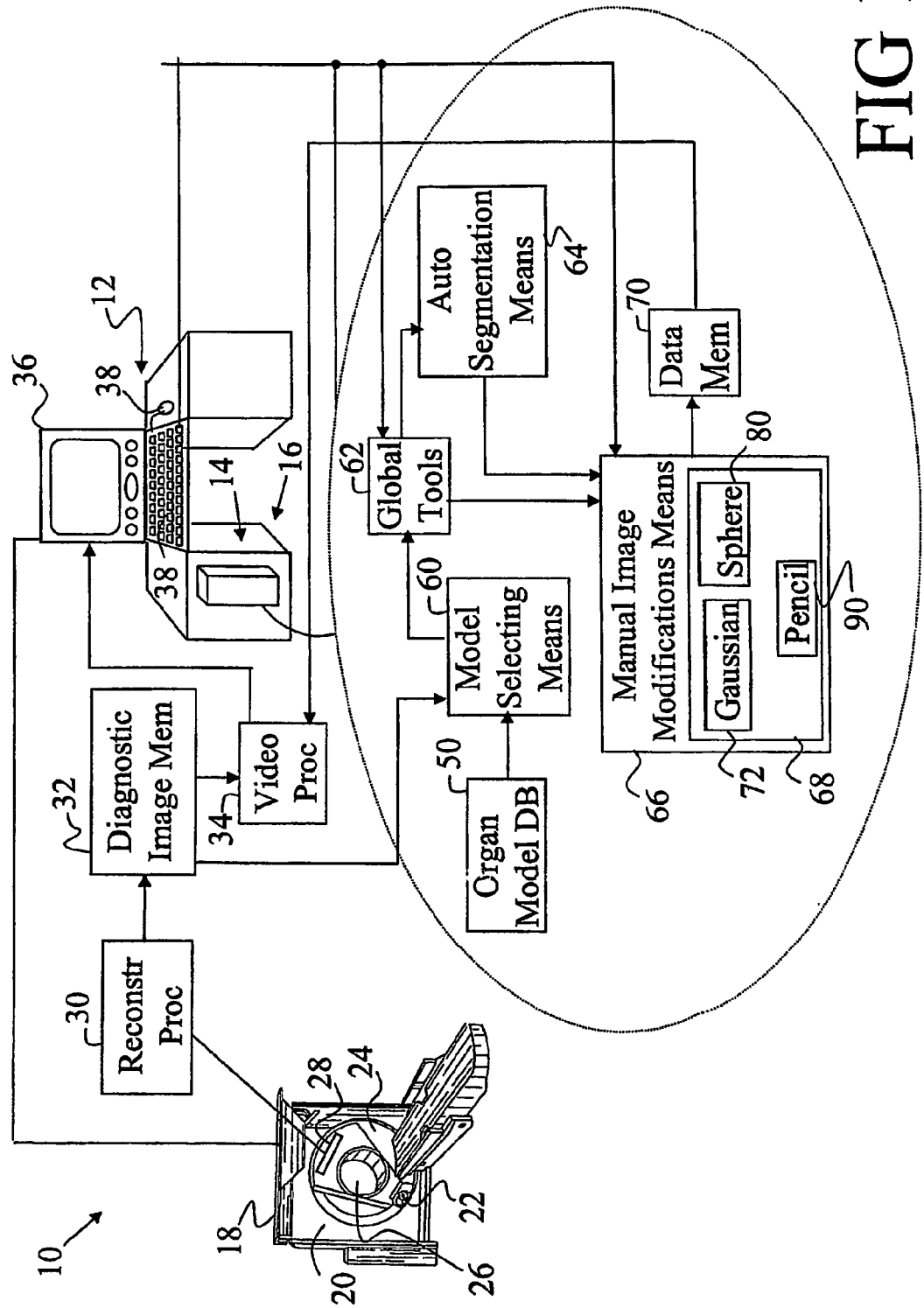
FIG. 1 is a diagrammatic illustration of a diagnostic imaging system.

With reference to FIG. 1, an operation of an imaging system 10 is controlled from an operator workstation 12 which includes a hardware means 14 and a software means 16 for carrying out the necessary image processing functions and operations. Typically, the imaging system 10 includes a diagnostic imager such as CT scanner 18 including a non-rotating gantry 20. An x-ray tube 22 is mounted to a rotating gantry 24. A bore 26 defines an examination region of the CT scanner 18. An array of radiation detectors 28 is disposed on the rotating gantry 24 to receive radiation from the x-ray tube 22 after the x-rays transverse the examination region 26. Alternatively, the array of detectors 28 may be positioned on the non-rotating gantry 20.

Typically, the imaging technician performs a scan using the workstation 12. Diagnostic data from the scanner 18 is reconstructed by a reconstruction processor 30 into 3D electronic image representations which are stored in a diagnostic image memory 32. The reconstruction processor 30 may be incorporated into the workstation 12, the scanner 18, or may be a shared resource among a plurality of scanners and workstations. The diagnostic image memory 32 preferably stores a three-dimensional image representation of an examined region of the subject. A video processor 34 converts selected portions of the three-dimensional image representation into appropriate format for display on a video monitor 36. The operator provides input to the workstation 12 by using an operator input device 38, such as a mouse, touch screen, touch pad, keyboard, or other device.

Figure 2:
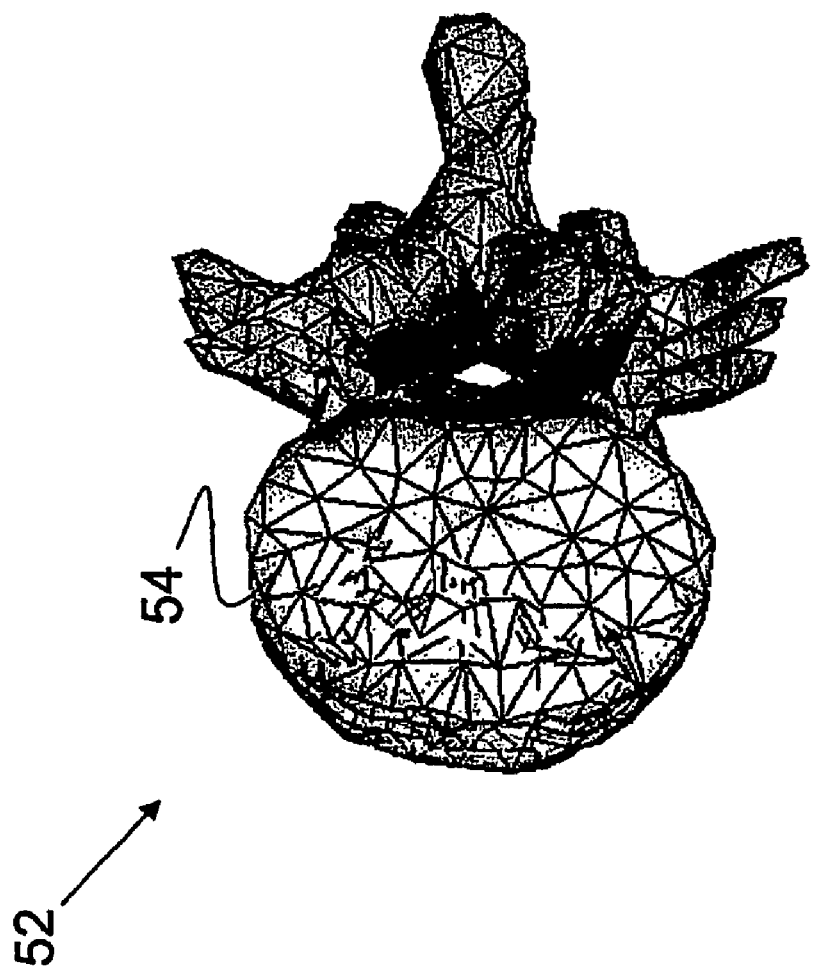
FIG. 2 is a graphical representation of an organ model using triangular surfaces for use with aspects of the present invention.

With continuing reference to FIG. 1 and further reference to FIG. 2, an organ model database 50 stores predetermined models 52 of specific organs and general shapes of areas of interest that could correspond to radiotherapy treatment areas of interest, by e.g., shapes approximating a tumor shape to be treated with radiation. Typically, the organ models 52 are defined as a set of polygons describing a surface. Preferably, the polygons are triangles and represented by a flexible triangular mesh 54. The basic structure is a list of vertices in (x, y, z) coordinates and a list of polygons which identify the vertices which comprise each polygon, e.g. each triangle has three vertices. Storage of basic structures and automatic segmentation of images using such triangular structures is more fully described in pending U.S. patent application Ser. No. 10/091,049 having Publication No. 2002/0184470 A-1 entitled Image Segmentation by Weese, et al.

With continuing reference to FIG. 1, the user selects a model of an organ from the organ model database 50 via a model selecting means 60. Preferably, the software 16 includes a user interface means which allow the user to select models by dragging and dropping the organ model over the subject anatomy represented by the image data while watching a superimposition of the diagnostic image and the organ model on the monitor 36. Various displays are contemplated. In one advantageous display format, three orthogonal slices through the 3D image which intersect at a common point are displayed concurrently in quadrants of the monitor. By shifting the intersection point and/or dragging the organ model, the fit in all three dimensions is readily checked.

The user best fits the model to the organ using of a set of global tools 62 which apply transformation to the entire model on the image. The global tools 62 include rotation, translation and scaling tools that allow the user to rotate, translate, and scale the model. The global tools 62 are applied by a use of the mouse 38 on each (x, y, z) dimension of the model, e.g. the mouse motion is converted into translation, scale or rotation such that all vertices in the model are transformed by the defined translation, scale, or rotation.

An auto-segmentation means or process 64 automatically adapts the best fitted model to the boundaries of the anatomical structures of interest. By sliding the intersection point, the user can check the fit in various directions and slices. If the user determines that the results of the auto-segmentation process 64 are not satisfactory, e.g. the desired segmentation accuracy is not achieved, the user initiates image modification via an image modification means 66 which includes a set of manual local tools 68 which allows the user to manipulate local regions of the model 52 to match the image data more accurately or in accordance with user's preferences. Alternatively, when the user determines that the auto-segmentation is not possible, the auto-segmentation process 64 is skipped. The local tools 68 comprise three main functions: selection of the local region (vertices) to be modified, the method by which the vertices are transformed, and the translation of the mouse motion into parameters defining the transformation.

The selection of the vertices is based either on the distance from the mouse position or the layers of vertex neighbors from the closest vertex to the mouse location. In the first case, all vertices within a specified distance from the mouse are selected. In the latter case, the vertex closest to the mouse is selected. All vertices which share a triangle with the first vertex are considered neighbors and comprise the first neighbor layer. A second neighbor layer is all vertices which share a triangle with any of the first layer of vertices. In this case, the selection of the vertices to be deformed is based on the number of neighbor layers to be used.

Additionally, control parameters related to local manipulation tools are stored as part of the organ model. In this way, optimal tool settings are maintained as part of the organ model. Of course, it is also contemplated that the manual tools (68) may be used to manipulate boundaries between multiple organs at one time or within a regional area with a single mouse motion.

The image undergoing segmentation and segmented images are stored in a data memory 70.

Figure 3:
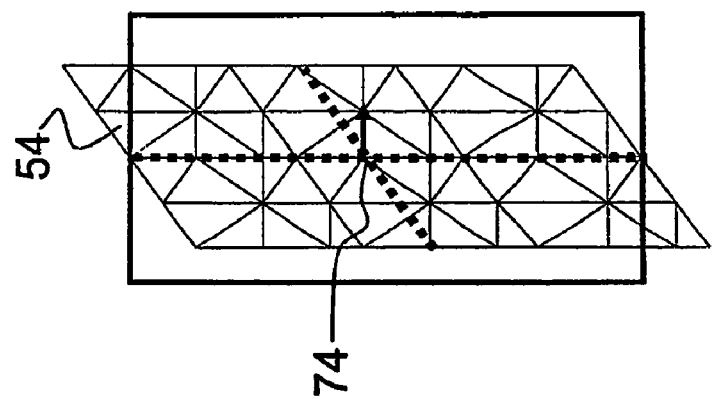
FIGS. 3-4 are graphical representations of a Gaussian pull tool in accordance with the present invention.
Figure 4:
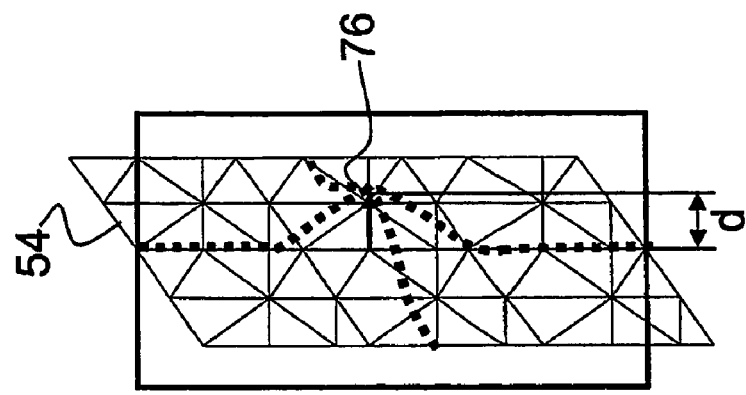

With continuing reference to FIG. 1 and further reference to FIGS. 3-4, a Gaussian pull tool 72 deforms the organ model by pulling the local vertices by a Gaussian weighted distance of the mouse motion d. Thus, the vertex that is at the initial position 74 of the mouse moves into position 76 the same distance d as the mouse motion d. Vertices farther away from the mouse move a shorter distance based on a Gaussian function scaling of the mouse motion. Typically, the Gaussian tool 72 is controlled by a single Gaussian radius which defines the width of the Gaussian spread. Alternatively, the Gaussian tool 72 is controlled by separate x- and y-Gaussian radii which allow for the x-radius to be used in the plane of motion of the mouse, and the y-radius to be used orthogonally to the drawing plane. In another embodiment, the Gaussian tool 72 is controlled by a function, e.g. triangle, parabola, etc., that smoothly transitions from 1 to 0 with the appropriate set of parameters to accomplish a transformation of the selected vertices.

In one embodiment, the Gaussian pull tool 72 pulls a Gaussian shaped distortion (or other functional shape the smoothly transitions from 1 to 0) but derives the distance that the distortion is pulled from the distance of the mouse position from the organ model. The organ model 52 is pulled directly to the mouse position enabling smooth drawing, rather than having to click up and down on the mouse to grab and stretch the organ.

Figure 6:
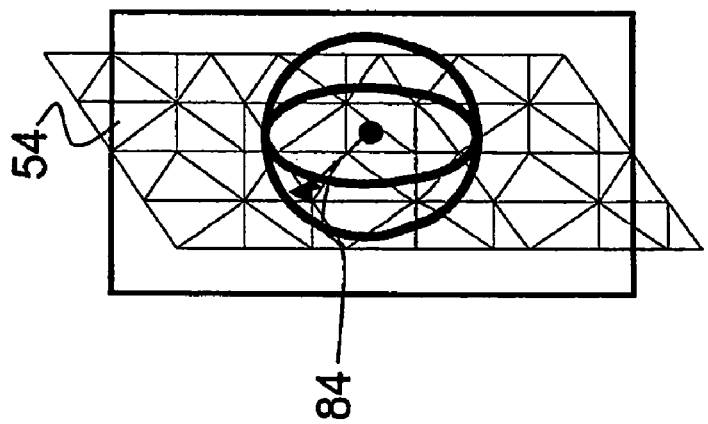
FIGS. 5-6 are graphical representations of a Sphere push tool in accordance with the present invention.
Figure 5:
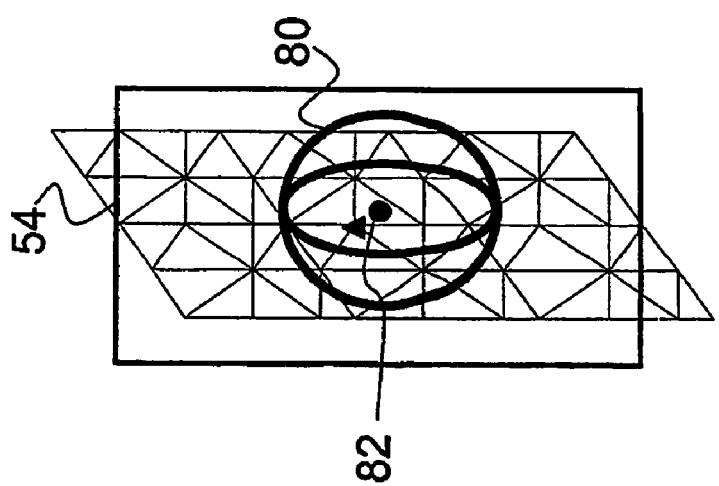

With continuing reference to FIG. 1 and further reference to FIGS. 5-6, a sphere push tool 80 searches for all vertices contained within a sphere 82 of a specified radius R around the mouse location 84. Each vertex in the sphere 82 is moved to the surface of the sphere along the vector from the mouse location 84 through the original vertex location. As the mouse moves the push tool 80 by moving location 84, the organ model 52 is pushed either inward or outward depending on the location of the vertex with respect to the mouse location 84. The Sphere tool 80 is controlled by a single sphere radius parameter that is preferably stored with the individual organ model. In this way, the surface is deformed analogous to pressing a spherical tool of the selected radius against a soft clay surface. But, on the computer, the tool 80 can be placed inside the model to push out or outside to push in. Of course, other surfaces of predetermined shapes such as ellipses are also contemplated. Optionally, the model surface can be re-triangulated after the surface modification to smooth the reshaped organ surface.

Figure 7:
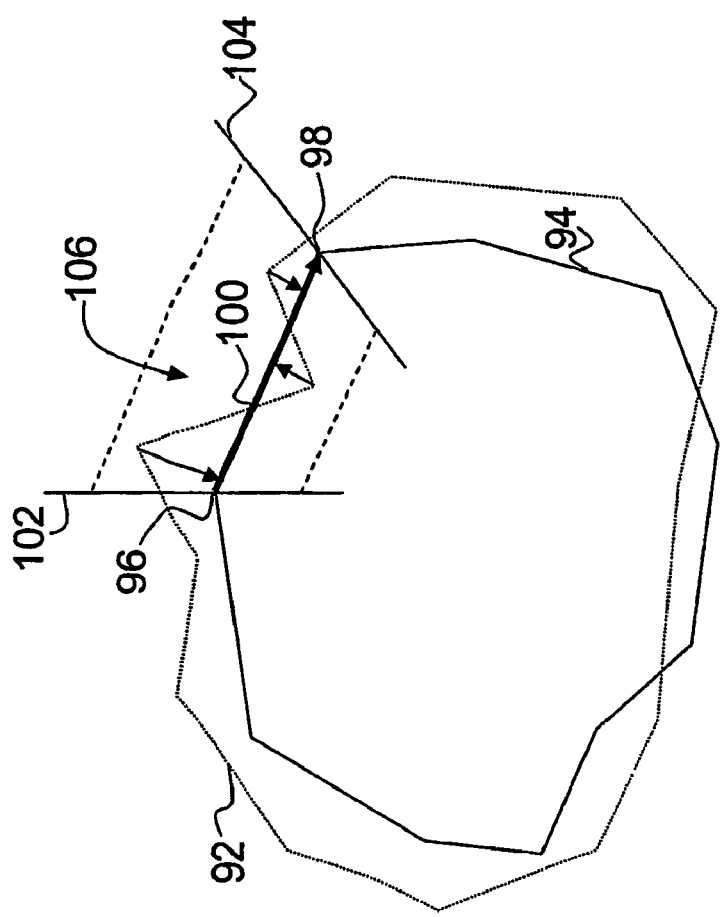
FIGS. 7-9 are graphical representations of a Pencil tool in accordance with the present invention.
Figure 9:
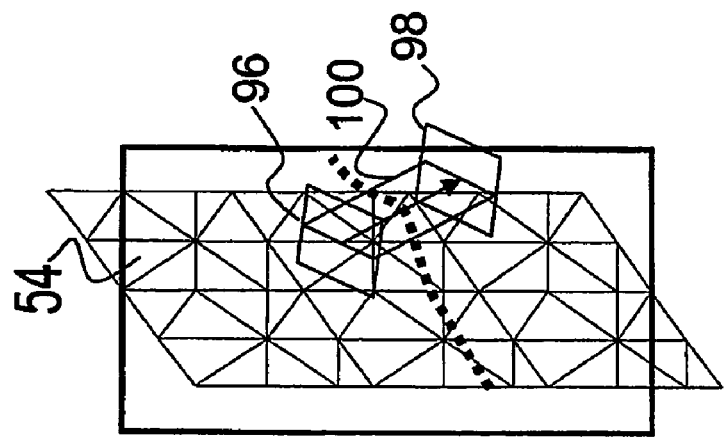
Figure 8:
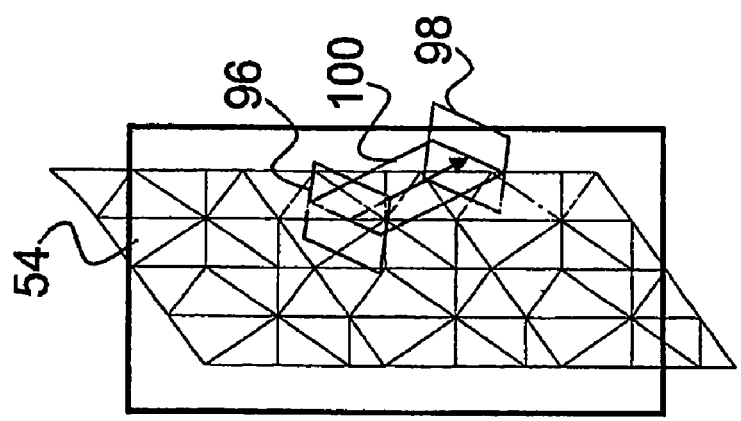

With continuing reference to FIG. 1 and further reference to FIGS. 7-9, a pencil draw tool 90 is used to deform an original boundary 92 of the organ model such that it aligns with a drawing path or actual boundary 94 of the drawing motion of the mouse. While the user uses the mouse to draw a line along the actual boundary 94 of the structure to be segmented, the model's original boundary 92 deforms to match the drawing path 94 in the plane of mouse motion. Outside of the plane of mouse motion, the organ model deforms to perform a smooth transition in the model. Rather than drawing a complete path 94, the drawing path 94 may be approximated with a series of dots.

The Pencil draw tool 90 recognizes begin 96 and end 98 points of each mouse step and defines a capture plane 100 through a vector whose normal vector is in the plane of the mouse motion and is normal to the mouse motion direction. Two end planes 102, 104, which are defined at the start and end points 96, 98, identify a capture range 106 around the mouse motion vector. Vertices located within the capture range 106 are pulled towards the capture plane 100. Vertices that lie on the plane 100 are pulled onto the plane 100. Vertices that lie further from the mouse motion plane are pulled with a Gaussian weighting of the distance to the capture plane 100 based on the distance from the mouse motion plane.

In one embodiment, the Pencil tool 90 is used to shrink fit an organ model to a predefined set of contours for a particular organ where the mouse motion is replaced with successive vertices of the pre-defined contour.

Preferably, the Pencil draw tool 90 is controlled by a In-Draw Plane distance which defines the maximum distance between a vertex of the organ model and the mouse for the vertex to be captured by the Pencil tool 90, and a From-Draw Plane parameter which dictates how the model 52 is deformed in the direction orthogonal to the drawing plane and represents the width of the Gaussian function used to weight the distance that the vertices move. In one embodiment, the Pencil draw tool 90 is controlled by a function that smoothly transitions from 1 to 0 to perform the weighting of the distance of vertex motion for vertices that do not lie on the drawing plane.

Optionally, the auto-segmentation process 64 is run after manual segmentation, preferably freezing the manually adjusted model surfaces against further modification or modification beyond preselected criteria.

The invention has been described with reference to the preferred embodiments. Modifications and alterations may occur to others upon a reading and understanding of the preceding detailed description. It is intended that the invention be constructed as including all such modifications and alterations insofar as they come within the scope of the appended claims or the equivalents thereof.

Having thus described the preferred embodiments, the invention is now claimed to be:

1. A diagnostic imaging system comprising:
   a scanner for acquiring image data of an organ;
   a reconstruction processor for reconstructing the image data into a three dimensional (3D) image representation of the organ;
   a workstation including a memory which stores a plurality of 3D shape models and one or more processors which define a set of global tools and set of manual tools;
   a user interface by which a user:
      selects a 3D shape model of the organ from the workstation memory;
      manipulates the set of global tools to fit the selected 3D shape model to the 3D image representation of the organ; and
      manipulates the set of manual tools to modify selected regions of the selected 3D shape model to match corresponding regions of the 3D image representation of the organ.

2. The system as set forth in claim 1, wherein the selected 3D shape model is represented by an adaptive mesh including:
   vertices and links which connect individual vertices, the set of manual tools deforming the mesh such that individual vertices are moved in accordance with a move of a mouse.

3. The system as set forth in claim 1, wherein the selected 3D shape model is represented by an adaptive mesh including vertices and the set of manual tools includes:
   manual tools which are used by a user to manipulate the mesh to match the 3D image representation of the organ.

4. The system as set forth in claim 3, wherein the manual tools include:
   a Gaussian pull tool which deforms a surface of the selected 3D shape model by pulling selected vertices along a predefined smooth curve.

5. The system as set forth in claim 4, wherein the predefined smooth curve is a Gaussian curve.

6. The system as set forth in claim 5, wherein the user interface controls a radius which defines a width of a Gaussian spread of the Gaussian curve.

7. The system as set forth in claim 6, wherein the user interface controls x- and y-radii of the Gaussian curve, wherein x-radius defines a width of the Gaussian spread in a direction of a move of a mouse and the y-radius defines a width of Gaussian spread in a direction which is orthogonal to the mouse move.

8. The system as set forth in claim 5, wherein the user interface controls include a mouse which pulls the vertices a distance from an initial position defined by the mouse to an end position defined by the mouse.

9. The system as set forth in claim 3, wherein the manual tools include:
   a sphere tool which moves vertices located within a predefined radius of the sphere to a surface of the sphere.

10. The system as set forth in claim 3, wherein the manual tools include:
    a pencil tool which deforms an original boundary of the selected 3D shape model to align the original boundary with a drawing path defined by a mouse.

11. The system as set forth in claim 1, wherein the set of global tools fits the selected 3D shape model by applying at least one of scaling, rotation, and translation to the selected 3D shape model as a whole.

12. The system as set forth in claim 1, wherein the selected 3D shape model is selected from an organ model database and wherein the user interface drags and drops the selected 3D shape model on 3D image representation of the organ.

13. A method of segmenting a image of a diagnostic imaging system, comprising:
    acquiring image data of an object;
    reconstructing the image data into a three dimensional (3D) image representation of the object;
    dragging and dropping a selected 3D shape model on the 3D image representation of the object;
    globally scaling, rotating and translating the selected 3D shape model to fit the selected 3D shape model globally to the 3D image representation of the object; and
    deforming local regions of the selected 3D shape model with a set of manual tools to match the local regions of the selected 3D shape model to the 3D image representation of the object.

14. The method as set forth in claim 13, wherein the selected 3D shape model is represented by an adaptive mesh which includes vertices and links connecting individual vertices and the step of deforming the local regions includes:
    selecting vertices to be deformed;
    selecting a transformation algorithm to transform the selected vertices;
    converting mouse motion into local deformation parameters; and
    transforming the selected vertices in the selected 3D shape model by the local deformation parameters.

15. The method as set forth in claim 13, wherein the set of manual tools includes:
    a Gaussian pull tool;
    a Sphere push tool; and
    a Pencil tool.

* * * * *